(12) United States Patent
You et al.

(10) Patent No.: US 7,095,993 B2
(45) Date of Patent: Aug. 22, 2006

(54) FREQUENCY AUTO-CORRECTION APPARATUS FOR CDMA MULTIPATH FADING CHANNEL

(75) Inventors: Xiaohu You, Jiangsu (CN); Yan Zhang, Jiangsu (CN); Ling Wang, Jiangsu (CN); Liangcheng Jiang, Jiangsu (CN); Shixin Cheng, Jiangsu (CN)

(73) Assignee: The MITT Research Institute of Telecommunication Transmission, Beijing (CN)

( * ) Notice: Subject to any disclaimer, the term of this patent is extended or adjusted under 35 U.S.C. 154(b) by 382 days.

(21) Appl. No.: 10/450,324

(22) PCT Filed: Dec. 12, 2001

(86) PCT No.: PCT/CN01/01618

§ 371 (c)(1),
(2), (4) Date: Sep. 29, 2003

(87) PCT Pub. No.: WO02/080424

PCT Pub. Date: Oct. 10, 2002

(65) Prior Publication Data

US 2004/0071116 A1    Apr. 15, 2004

(30) Foreign Application Priority Data

Dec. 18, 2000    (CN) ................................ 00 1 28223

(51) Int. Cl.
*H04B 1/18*    (2006.01)
(52) U.S. Cl. ................ 455/192.2; 455/164.2; 455/182.2; 455/260; 455/205; 455/65; 455/67.16; 455/67.13; 375/344; 375/148; 375/147; 375/149; 375/371; 375/347; 375/349; 370/342; 370/441; 370/335

(58) Field of Classification Search ................ 455/65, 455/203, 205, 260, 192.2, 182.2, 164.1, 164.2, 455/67.13, 67.16; 375/344, 148, 130, 347, 375/149, 147, 371, 349; 370/441
See application file for complete search history.

(56) References Cited

U.S. PATENT DOCUMENTS 5,691,974 A * 11/1997 Zehavi et al. ................ 370/203
6,058,101 A *  5/2000 Huang et al. ................ 370/208
6,269,075 B1 *  7/2001 Tran ............................ 370/206

(Continued)

FOREIGN PATENT DOCUMENTS

CN        1147321 A    5/2000

(Continued)

OTHER PUBLICATIONS

International Search Report of Jul. 18, 2002, ISA/CN.

*Primary Examiner*—Marceau Milord
(74) *Attorney, Agent, or Firm*—Greenberg Traurig LLP

(57) ABSTRACT

An automatic frequency correction (AFC) apparatus used for CDMA multipath fading channels comprises a frequency-offset evaluator, an automatic frequency correction loop filter and a carrier frequency adjuster. The present invention provides a "multipath energy window" designing method for the non-determinacy of multipath signals in mobile communication environment. Frequency-offset information can be extracted from the multipath energy window by a simple calculation and evaluated by a maximal SNR weight process. This invention also provides a step-variable accumulation adjusting method and greatly improves the response speed of the AFC apparatus as compared with a conventional loop filter, whereby supplies better AFC required for CDMA mobile terminals.

4 Claims, 1 Drawing Sheet

U.S. PATENT DOCUMENTS

| | | |
|---|---|---|
| 6,289,061 B1 * | 9/2001 | Kandala et al. ............. 375/344 |
| 6,466,606 B1 * | 10/2002 | Jou .......................... 375/130 |
| 6,590,945 B1 * | 7/2003 | Brardjanian et al. ........ 375/340 |
| 6,625,197 B1 * | 9/2003 | Lundby et al. ............. 375/130 |
| 6,728,301 B1 * | 4/2004 | Chrisikos .................... 375/147 |
| 6,731,911 B1 * | 5/2004 | Hirata et al. ................. 455/71 |
| 6,956,895 B1 * | 10/2005 | Vihriala ...................... 375/148 |

FOREIGN PATENT DOCUMENTS

| | | |
|---|---|---|
| CN | 1254994 A | 5/2000 |
| WO | WO 9622661 A2 | 6/1996 |
| WO | WO 0048346 A2 | 8/2000 |

* cited by examiner

FREQUENCY AUTO-CORRECTION APPARATUS FOR CDMA MULTIPATH FADING CHANNEL

FIELD OF THE INVENTION

The present invention relates to a CDMA (code division multiple access) cellular communication system, more specifically, to an automatic frequency correction apparatus used for CDMA multipath fading channel.

BACKGROUND OF THE INVENTION

Mobile communication techniques have become a widely used communication manner for their advantages such as flexibility and convenience since 1980s. In a lot of mobile communication standards, CDMA cellular communication techniques show great potential for their features associated with large capacity, simple frequency planning, good communication quality and small electromagnetic interference. IS-95 CDMA cellular communication system proposed by Qualcomm Inc. and rapidly developed all over the world uses this CDMA cellular communication technique. Several candidate schemes of the third generation of digital cellular communication system are established on the basis of CDMA techniques.

In mobile communication systems, the stability of initial frequency in a mobile terminal is limited to about 1 ppm because of the restrict by volume and cast, etc. This results in approximate several hundred Hz to several KHz frequency difference between a base station and a mobile terminal. Therefore, it is necessary to introduce an automatic frequency correction (AFC) function into mobile terminals, thereby to decrease the degradation of the system performance.

Multipath fading which causes serious multipath interference exists in a mobile communication system. In designing an AFC, the adverse effects caused by the multipath fading channel should be considered. In a CDMA mobile cellular communication system employing a spread spectrum scheme, in general, it is necessary to transmit pilot signals with confirmation information. The amplitude and phase information of multipath signals may be evaluated by receiving the pilot signals. With respect to the fixed frequency-offset, which is overlapped on the multipath fading signals, in both transmitting side and receiving side, it is possible to extract the frequency-offset evaluating values of both transmitting side and receiving side by means of simple processing. A desired AFC function may be obtained by suitably adjusting the local frequency reference source of a mobile terminal by using the evaluating values. The method of extracting the frequency-offset information and whereby adjusting the local frequency reference source is referred to as AFC loop design.

The AFC loop design of a CDMA receiver need to meet the requirements of fast response speed, returning to active state at time when a mobile terminal turns on or loses lock, and compensating frequency difference between transmitting side and receiving side in a short time in addition to operate stably in the environment of multipath fading channel.

SUMMARY OF THE INVENTION

It is therefore an object of the present invention to provide an automatic frequency correction apparatus which provides a "multipath energy window" designing scheme to overcome the non-determinacy of multipath signals in mobile communication. The automatic frequency correction apparatus according to the invention is capable of extracting effective multipath information and frequency-offset information from the multipath energy window, employing a step-variable accumulation loop filtering mode, and thereby achieving the fast response speed and meeting the requirements for the AFC function of CDMA mobile terminals.

To achieve the object of the invention, the automatic frequency correction apparatus of CDMA multipath fading channel according to the present invention comprises a frequency-offset evaluator; an automatic frequency correction loop filter; and an carrier frequency adjuster.

The automatic frequency correction apparatus of the present invention provides a multipath energy window design scheme. It is possible to extracting effective frequency-offset information from the multipath energy window and evaluating frequency-offset by using maximal signal-noise ratio weight method with a simply calculation for the non-determinacy of multipath signals in mobile communication. To improve the response speed of AFC apparatus, the present invention provide a step-variable accumulation adjusting method which is capable of satisfying the requirements for the AFC function of CDMA mobile terminals.

BRIEF DESCRIPTION OF THE DRAWINGS

The above and other objects, features, and advantages of the present invention will become apparent from the following description with reference to the accompanying drawings, which illustrate examples of the present invention.

DETAILED DESCRIPTION OF THE PREFERRED EMBODIMENTS

Referring now to the accompanying drawings, there are shown preferred embodiments of the automatic frequency correction apparatus according to the invention.

The automatic frequency correction apparatus according to present the invention comprises a frequency-offset evaluator, an automatic frequency correction loop filter, and a carrier frequency adjuster.

Figure 2:
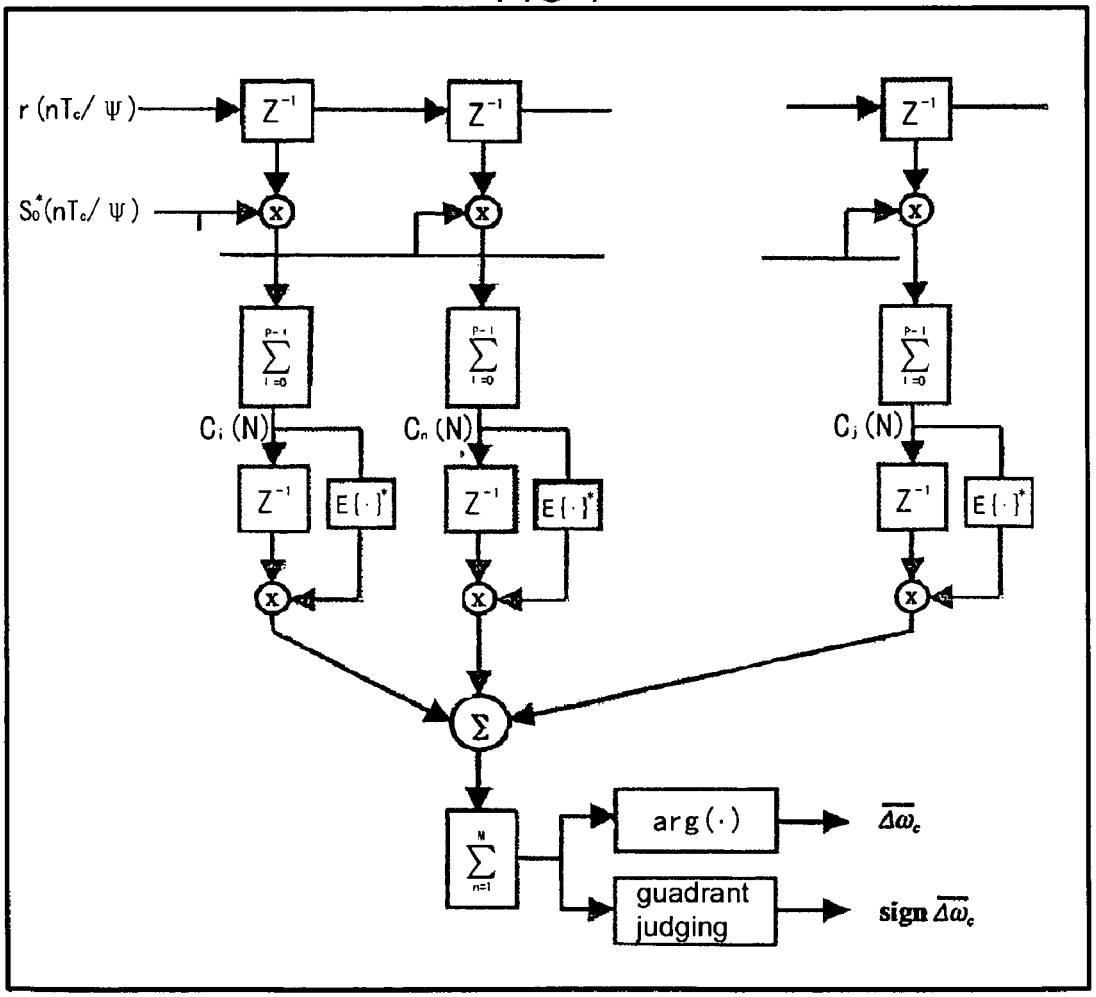
FIG. 2 is a block diagram schematically showing the frequency-offset evaluator in the automatic frequency correction apparatus as shown in FIG. 1.

The frequency-offset evaluator comprises a channel parameter evaluating unit and a frequency-offset evaluating unit. FIG. 2 shows the implementing flowchart of the frequency-offset evaluator.

The channel parameter evaluating unit comprises a tap delay line and a parallel correlator. The operation of the channel parameter evaluating unit is described as follow.

A pilot channel in CDMA system is used for transferring a pilot sequence known in advance which may provides a system timing, extracts carriers, evaluates channels, and executes hand-off, etc. A equivalent baseband receiving signals may be expressed as equation (1) when the system simultaneously transmits signals through a plurality of channels, $$r(t) = \sum_n c_n \cdot \sum_i d_i s_i(t - n/W) + z(t) \qquad (1)$$

wherein $d_i$ and $s_i(t)$ represent the signs and equivalent baseband signals transmitted through ith code division channel in downstream channels. The term of i=0 corresponds to the pilot channel. In general, it assumes that the sign transmitted by a pilot channel is $d_0$=0, $1/W=T_c$ is the time width of one chip, z(t) is complex White Gaussian noise of zero average value, $c_n$ is a fading factor of nth path of the channels. The purpose for evaluating channel parameter is to evaluate channel fading factor $c_n$ based on the received signals r(t) and the known pilot sequence $s_0(t)$.

It is assumed that frequency selective slow fading channel model is used as a mobile channel, $c_n$ is then approximate to a constant within the channel evaluation region $t \in [0, NT_c]$. $c_n$ and composition evaluation value of frequency-offset error $e^{j\Delta\omega_c t}$ are given as follow:

$$\bar{c}_n(N) = \frac{1}{NE_c} \int_0^{NT_c} r(t + nT_c) \cdot s_0^*(t) dt \qquad (2)$$

$$= c_n \cdot \left\{ e^{j\Delta\omega_c T_c/2} \frac{\sin(\Delta\omega_c NT_c/2)}{\Delta\omega_c NT_c/2} \right\} + N_a + N_c + N_z$$

wherein $N_a$, $N_c$, and $N_z$ are the outputs caused by multipath interference, multiple access interference and white noise passed through a correlator due to the non-ideal correlation characteristic, $T_c$ is a time width of one chip, $NT_c$ is an integration region of a channel evaluation, and $E_c$ is energy transmitted through a pilot channel within one chip.

Frequency-offset Evaluation:

f it is further assumed that $c_n$ is approximate to keep a constant within two adjacent blocks $t \in [0, NT_c]$ and $t \in [NT_c, 2NT_c]$, following equation can be obtained:

$$E\{\bar{c}_n^*(N) c_n(N+1)\} = |c_n|^2 e^{j\Delta\omega_c NT_c} \left[ \frac{\sin(\Delta\omega_c NT_c/2)}{\Delta\omega_c NT_c/2} \right]^2 \qquad (3)$$

wherein $E\{\cdot\}$ represents a assembly average, $\bar{c}_n(N+1)$ is a evaluating value within the block $t \in [NT_c, 2NT_c]$. It is assumed that the obtained values of $N_a$, $N_c$, and $N_z$ within the two adjacent blocks are not correlation. Equations (2) and (3) are used for a single path. In the case where effects from all effective multipath are considered, a maximal-ratio combining evaluating equation can be obtained as follow:

$$E\left\{ \sum_n \bar{c}_n^*(N) \bar{c}_n(N+1) \right\} = e^{j\Delta\omega_c NT_c} \left[ \frac{\sin(\Delta\omega_c NT_c/2)}{\Delta\omega_c NT_c/2} \right]^2 \sum_n |\bar{c}_n|^2 \qquad (4)$$

if the corresponding assembly average is substituted by a average evaluation value in M time blocks, following equation (5) can be given:

$$\overline{\Delta\omega}_c = \frac{1}{NT_c} \arg\left( \sum_{N=1}^M \sum_n \bar{c}_n^*(N) \bar{c}_n(N+1) \right) \qquad (5)$$

the effective evaluation range of $\overline{\Delta\omega}_c$ in equation (5) is $$-\frac{\pi}{NT_c} < \overline{\Delta\omega}_c < \frac{\pi}{NT_c} \qquad (6)$$

The effective distribution range of channel fading factor $c_n$ in equation (1) is defined as multipath signal energy distribution window (hereinafter is referred to as multipath energy window). The size of the window may be determined by time-delay extend range of multipath channels. For the sake of simplifying following discussion, the effective distribution range of $c_n$ may be set to $n \in [-L_1, L_2]$. The size of the window in multipath fading environment may be set differently for different areas, for example, 3 μs for cities, 6 μs for countries, and 15 μs for mountain areas. The size of window is associated with environments where the cellular communication system located, and is regardless of the used frequency band. The size of multipath energy window may be selected according to the maximal possible value, for example, no more than 30 μs, and then the value of $L=L_2-L_1+1$ is not more than 30 μs/$T_c$, so that a spreading receiver can be used in various environment.

In multipath energy window, not all signal arrival paths are effective. To this end, a threshold may be set to judge the signal energy (i.e., intensity of $c_n$) for each of paths in a window. A signal arrival path is judged as effective path when the channel evaluation intensity in same path is larger than the threshold equal or more than two times continuously. Otherwise, the path is judged as a pure interference path. To avoid the degradation of the performance, the calculation is not applied to all pure interference paths. The threshold is set slightly larger than the side lobe value of a pilot signal (PN code) partial correlation value.

For simplifying the calculation, a quadrantal judgement method is employed to evaluate the polarity of frequency-offset evaluation so as to achieve the FPGA/ASIC design:

$$x = \text{sign}(\overline{\Delta\omega}_c) = \begin{cases} +1, & \text{if } \text{Im}\left\{ \sum_{N=1}^M \sum_n \bar{c}_n^*(N) \bar{c}_n(N+1) \right\} > 0 \\ -1 & \text{if } \text{Im}\left\{ \sum_{N=1}^M \sum_n \bar{c}_n^*(N) \bar{c}_n(N+1) \right\} < 0 \end{cases} \qquad (7)$$

The polarity evaluating value is filtered in loop. The filtered signals are D/A (digital/analog) converted so as to adjust the voltage-controlled oscillator used as local reference frequency source of the mobile terminal such that the output signals gradually approximate the actual carrier frequency.

2. Loop Filter Design

Figure 1:
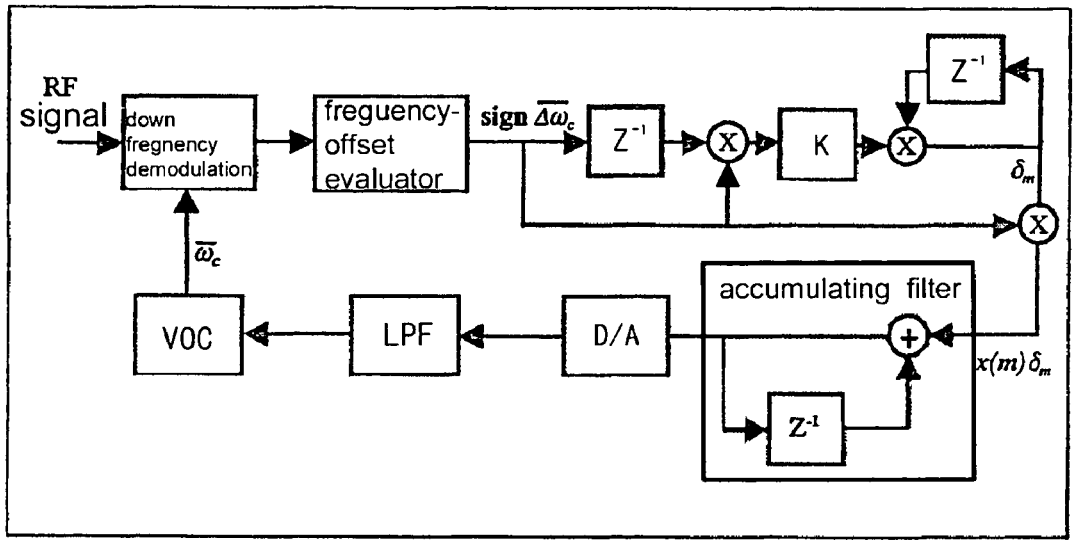
FIG. 1 is a block diagram schematically showing the automatic frequency correction apparatus according to an embodiment of the invention.

The loop filter according to the invention is now described with reference of FIG. 1. A simple method of loop filter uses a loop filter having a fixed step (interval). In fact, due to the lack of amplitude information relating to "$\overline{\Delta\omega}_c$", converging speed of loop adjustment is greatly decreased, or a large frequency-offset jitter error is produced after the converging.

In the case where frequency-offset is large, a small step would cause a long converging time. The frequency-offset jitter error is determined by the step when the output from VCO approaches the carrier frequency. The smaller the step is, the smaller the jitter error is. Therefore, the present invention proposes an adaptive step-variable loop adjustment method. This method improves the converging speed of a filter loop, and ensures a small frequency-offset jitter error after converging. The principle of this method is described as follows.

An emulating result shows that "$\overline{\Delta\omega}_c$" evaluation is accurate when frequency-offset is large, and the polarity outputs x substantially take same signs. The possibility which the polarity outputs x take inverse signs increases when the outputs from VCO approach real carrier frequency. The present invention provides an adaptive step-variable loop adjustment arithmetic based on above emulating result. This arithmetic is performed by a step calculating unit and an adaptive accumulating filter.

Step Calculating Unit:

It is assumed that the (m−1)th polarity output of $\overline{\Delta\omega}_c$ is x(m−1), and the employed step for AFC loop filter is $\delta_{m-1}$, the mth output $\delta_m$ is then given by equation (8).

$$\delta_m = \delta_{m-1} K^{x(m)x(m-1)}, K>1 \tag{8}$$

that is, $\delta_m$ is K times as large as $\delta_{m-1}$ when x(m) and x(m−1) take same signs, $\delta_m$ is 1/K as large as $\delta_{m-1}$ when x(m) and x(m−1) take inverse signs. It indicates the facts that frequency-offset is large (that is, corresponding to a frequency adjusting stage) when x(m) and x(m−1) take same signs and that frequency-offset is small (that is, corresponding to a frequency locking stage) when x(m) and x(m−1) take inverse signs. The step is increased to shorten tracking time if frequency-offset is large, and the step is decreased to increase the accuracy of AFC if frequency-offset is small.

2. Adaptive Accumulating Filter:

It is assumed that the accumulating filter input is $\delta_m x(m)$, and the accumulating filter output is y(m) respectively, then, equation (9) can be given:

$$y(m) = \sum_{i=-\infty}^{m} \delta_{m-i} x(m-i) = y(m-1) + \delta_m x(m) \tag{9}$$

Z-transformation of its impulse response is obtained as follow:

$$H(z) = \frac{Y(z)}{X(z)} = \frac{\delta_m}{1-z^{-1}} \tag{10}$$

In fact, equation (10) is substantially an adaptive accumulating filter. Its coefficient is updated based on equation (8).

A constant factor K, for example K=2, may be used to implement AFC loop filtering so as to facilitate the practice of AFC loop filtering. In this way, equation (8) may be calculated in a manner of logic shift. The minimum and maximal ranges of step factor may be limited within the range, for example, given as equation (12), while frequency-offset jitter error is reduced as small as possible so as to assure that a mobile terminal can recover lock state fast after losing lock.

$$1 > \delta_m > 2^{-12}, \text{ for } \forall m \tag{11}$$

In this case, the AFC loop may have a small frequency-offset jitter error in converging state, and the step factor can be adjusted to a larger value rapidly when a mobile terminal suddenly loses lock. The initial value of step may be an intermediate value within the range represented in equation (11), that is, $$\delta_0 = 2^{-6} \tag{12}$$

The present invention employs an adaptive step-variable accumulation loop filtering method, the calculating needs only shifting operation and accumulating operation so that it can be properly implemented by logic circuits. The response speed of AFC loop is greatly improved and the requirements for AFC function of a CDMA mobile terminal are preferably satisfied by adaptively adjusting the size of the step factor.

3. Carrier Frequency Adjustment

The output signals from adaptive accumulating filter are subjected to D/A conversion, the resultant voltage signals control the local carrier frequency of the voltage-controlled oscillator (VCO) through a low pass loop filter (LPF), and make the local carrier frequency approach the carrier frequency value of the received signals gradually.

As described above, the AFC means suitable to multipath fading channels according to the present invention is comprised of a frequency-offset evaluator, an AFC loop filter and a carrier frequency adjuster. FIG. 2 is a block diagram showing the AFC means for multipath fading channels according to an embodiment of present invention. The configuration and functions of each of parts in the AFC means is discussed as follows.

The frequency-offset evaluator comprises a channel parameter evaluating unit and a frequency-offset evaluating unit.

The channel parameter evaluating unit comprises tap delay lines and a parallel correlator. The tap delay lines receive base band sampling signals. The sampling interval may be set to $T_c/M$, and M may be set to, for example, 2, 4, or 8 as desired. The parallel correlator is controlled by an external timing to calculate the composite evaluating value of all multipath channel fading parameter $\overline{c_n}(N)$ and frequency-offset error $e^{j\Delta\omega_c t}$ within the multipath energy window represented in equation (2), and the obtained result is processed in frequency-offset evaluating unit.

The frequency-offset evaluating unit performs the calculation for equations (3) and (4) based on the composite evaluating value. In practice calculation, the required frequency-offset evaluating value $\overline{\Delta\omega}_c$ may be obtained by replacing assembly average with average evaluating value in M time blocks. The polarity of frequency-offset evaluation may be evaluated using the quadrant judging method, and the evaluated value x(m) is provided to the AFC loop filter.

The AFC loop filter comprises a step calculating unit and an adaptive accumulating filter. The step calculating unit calculates step $\delta_m$ for mth output in accordance with equation (8) based on the frequency-offset evaluating value $\overline{\Delta\omega}_c$, $\delta_m x(m)$ is used as the signal input the adaptive accumulating filter. The adaptive accumulating filter performs adaptive accumulating filtering to $\delta_m x(m)$ in accordance with equation (10), and the obtained result is provided to the carrier frequency adjusting unit.

The carrier frequency adjustment is performed as follows: the output signals from adaptive accumulating filter are subjected to D/A conversion, the resultant voltage signals control the local carrier frequency of the voltage-controlled oscillator (VCO) through a low pass loop filter (LPF), and make the local carrier frequency approach the carrier frequency value of the received signals gradually.

EXAMPLE

Next, the implement of the present invention is described using a mobile terminal in CDMA 2000-1x system by way of an example. The downstream channels in CDMA 2000-1x system have continuously transmitted pilot channels which is used for extracting timing, initiating synchronization, searching cells and cohering demodulation, etc. in the mobile terminal receiver. In this system, spreading chip rate is 1.2288 Mcps, chip interval is set to Tc=1/1.2288 ms, and pilot channel PN code is a pseudo random sequence with length of $2^{15}$.

The receiver may use four times, that is, $\Psi=4$, over chip sampling rate. The integrating region for each channel evaluating may set to $256T_c$, and the length of multipath energy window may set to $32T_c$. It is necessary to calculate the channel parameter evaluation $\bar{c}_n$ in a RAKE receiver since the AFC circuit is used along with RAKE receiving circuit. Therefore, autocorrelation operation can be executed by using the arrival path of effective signals in channel evaluating results of RAKE receiver directly (as shown in equations (4) and (5)). Then, the executed result is subjected to quadrant judgement (as shown in equation (7)) so as to obtain frequency-offset evaluation needed by AFC filtering loop.

In present example, the AFC loop filtering parameters may be set to $K=2$, $\delta_0=2^{-6}$, and the range of $\delta_m$ should meet the requirement of equation (11), the operation accuracy of accumulating filter may be set to 14 bits, the accuracy of D/A converter may be set to 8 bits. Maximal adjustable frequency-offset is ±2400 Hz.

This example can apply to vehicle mobile station in CDMA2000-1x cellular mobile communication system under Standard 3GPP2 Release A. The spread spectrum part of the mobile station may be implemented by, for example, a XC4085xla FPGA chip, a product of Xilinx company. The AFC loop designed according to the present invention can stably operate in multipath fading environment of vehicle mobile station. The initially synchronizing time for step-variable AFC loop is about 0.1 s, and one order is less than the time required for synchronizing conventional step-fixed AFC loop.

The present invention employs a step-variable accumulation loop filtering method, the calculating needs only shifting operation and accumulating operation so that it is properly implemented by logic circuit. The response speed of AFC loop is greatly improved and the requirements for AFC function of a CDMA mobile terminal are preferably satisfied by adaptively adjusting the size of the step factor.

It is possible that the AFC means according to the present invention is used along with RAKE receiver. Therefore, it is easy to calculate the frequency-offset evaluation information required for the AFC means by using the multipath channel evaluation provided by a spread spectrum RAKE receiver.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A automatic frequency correction apparatus used for CDMA multipath fading channel comprises:
    a frequency-offset evaluating means for extracting frequency-offset information from a multipath energy window and evaluating the frequency-offset value $\overline{\Delta\omega}_c$ by using maximal signal-noise ratio weight method;
    an automatic frequency correction (AFC) loop filter for calculating a step $\delta_m$ of mth output based on the evaluated frequency-offset value and performing adaptive accumulating filtering on the calculated step $\delta_m$; and
    a carrier frequency adjuster for making the local carrier frequency approach the carrier frequency value of the received signals gradually.

2. The automatic frequency correction apparatus according to claim 1, wherein
    said frequency-offset evaluating means further includes:
    a channel parameter evaluating means for receiving baseband sampling signals which the sampling interval is $T_c/M$ and for calculating a composite evaluating value of all multipath channel fading parameter $\bar{c}_n(N)$ and a frequency-offset error $e^{j\Delta\omega_c t}$ within a multipath energy window, and
    a frequency-offset evaluating means for performing a calculation for frequency-offset evaluating value $\overline{\Delta\omega}_c$, based on said composite evaluating value and for evaluating polarity of frequency-offset evaluation using quadrant judging method and providing the evaluated value x(m) to said AFC loop filter;
    said AFC loop filter further includes:
    a step calculating means for calculating the step $\delta_m$ of mth output based on the frequency-offset evaluating value $\overline{\Delta\omega}_c$, and
    an adaptive accumulating filter performing adaptive accumulating filtering on $\delta_m x(m)$ by using $\delta_m x(m)$ as input signals, and providing the filtered signals to said carrier frequency adjuster; and
    said carrier frequency adjuster converts the output signals from said adaptive accumulating filter, controls the local carrier frequency of a voltage-controlled oscillator (VCO) through a lowpass loop filter (LPF) using converted voltage signals.

3. The automatic frequency correction apparatus according to claim 2, wherein said frequency-offset evaluating means evaluates a channel fading factor $c_n$ of effective arrival paths and frequency-offset error $e^{j\Delta\omega_c t}$ within a multipath energy window.

4. The automatic frequency correction apparatus according to claim 2, wherein said AFC loop filter employs an adaptive step-variable accumulation loop filtering method.

* * * * *